United States Patent

Oya et al.

[15] 3,665,435

[45] May 23, 1972

[54] SYSTEM FOR CONTROLLING TAPE READ-OUT DEVICES

[72] Inventors: Tsutom Oya; Kiyoshi Ebine, both of Tokyo, Japan

[73] Assignees: Japan Business Automation Co., Ltd., Tokyo; Tokyo Shibaura Electric Co., Ltd., Kawasaki-shi, Japan

[22] Filed: May 11, 1970

[21] Appl. No.: 36,254

[30] Foreign Application Priority Data

May 12, 1969 Japan....................................44/35785

[52] U.S. Cl.....................340/174.1 B, 226/49, 340/174.1 H

[51] Int. Cl..........................................................G11b 15/20

[58] Field of Search..................226/49, 178; 179/100.2 PM; 340/174.1 B, 174.1 C, 174.1 G, 174.1 H

[56] References Cited

UNITED STATES PATENTS

| | | | |
|---|---|---|---|
| 3,561,656 | 2/1971 | Hertrich | 226/49 |
| 3,136,465 | 6/1964 | Comstock | 226/49 |
| 3,274,574 | 9/1966 | Miller | 340/174.1 |

*Primary Examiner*—Bernard Konick
*Assistant Examiner*—J. Russell Goudeau
*Attorney*—Kemon, Palmer & Estabrook

[57] ABSTRACT

A system for controlling tape read-out devices to read out data recorded on a tape in such a manner that the tape is first driven in the direction opposite to the read-out direction and after a predetermined time it is driven in the read-out direction for starting the read-out.

4 Claims, 45 Drawing Figures

INVENTORS
Isuitomu Oya
BY Kiyoshi Ueno
Kenyon, Palmer & Estabrook
Attorneys

INVENTORS
Tsutomu Oya
Kiyoshi Ebine
BY
Kemon Palmer & Estabrook
Attorneys

INVENTORS
Tsutomu Oya
Kiyoshi Ebine
BY Kenyon, Palmer & Estabrook
Attorneys

SYSTEM FOR CONTROLLING TAPE READ-OUT DEVICES

BACKGROUND OF THE INVENTION

This invention relates to improvements in the apparatus for controlling magnetic tape read-out devices.

The read-out of data recorded on a magnetic tape is usually carried out block by block. The gap between adjacent blocks is subject to restriction from the start/stop characteristic particular to the magnetic tape read-out device, and with the block gap of less than a predetermined length it is impossible to read out data on a portion adjacent the beginning of the next data block.

An example of the conventional system for controlling the magnetic tape read-out device is now described with FIGS. 1 and 2A to 2I of the accompanying drawings.

As shown in FIG. 1, it comprises an instruction decoding circuit 2, an instruction storing circuit 3, a magnetic tape read-out device 4, counters 5 and 6, a start/stop flip-flop 7, a read-out control flip-flop 8, a stop detecting circuit 9, counters 10 and 11 and a data storing circuit 12.

In the operation of the read-out device control system of the above construction, the read-out instruction in the form of a pulse is fed through an input terminal 1 to the instruction decoding circuit 2, decoded therein and stored in the instruction storing circuit 3. When the signal stored in the instruction storing circuit 3 is a positive signal, the read-out operation of the magnetic tape read-out device is such that the magnetic tape is driven in the forward direction, while with a negative instruction signal the magnetic tape is caused to travel in the reverse direction.

The output signal from the instruction storing circuit 3 is simultaneously fed both to the magnetic tape read-out device 4 and to the counters 5 and 6, which send out respective outputs after respective predetermined time intervals $T_1$ and $T_2$, as shown in FIGS. 2A to 2I, to respectively set the start/stop flip-flop 7 and the read-out control flip-flop 8.

The tape movement is started by the magnetic tape read-out device 4 upon appearance of an output signal from the start/stop flip-flop 7 at time $T_1$ after appearance of the read-out instruction pulse. It is in the forward direction if the signal from the instruction storing circuit 3 is a positive signal, while it is in the reverse direction in case of a negative instruction signal, as is mentioned earlier. Until a predetermined time $(T_2 - T_1)$ is passed after starting the magnetic tape, the tape speed is gradually increased to reach a constant speed, whereupon the read-out control flip-flop 8 is set to provide its set output to the magnetic tape read-out device 4, which then starts the read-out operation to read data out of the magnetic tape. The data read out is temporarily stored in the data storing circuit 12 before they are sent out through an output terminal 13 to an external circuit (not shown).

During the read-out operation, a code indicating the termination of one data block is read out, whereupon the stop detecting circuit 9 acts to produce an output pulse for setting counters 10 and 11. The counter 10 provides an output signal to the reset side of both start/stop and read-out control flip-flops 7 and 8 at time $T_3$ after the impression of the input signal, and the counter 11 provides an output signal to the instruction storing circuit 3 to reset the content thereof at time $T_4$ after the impression of the input signal. When the flip-flops 7 and 8 and the instruction storing circuit 3 are reset, the tape speed is decreased, and after a predetermined time the tape is stopped to complete the read-out for one data block. The above sequence of actions is repeated to carry out the read-out of the magnetic tape.

As is seen from the foregoing, the operation of the conventional magnetic tape read-out control system involves what may be called start and stop lengths; the length of the tape required to pass the magnetic head after starting the tape until a constant tape speed is reached, and the length of the tape required to pass the magnetic head after interrupting the constant tape speed until the tape speed becomes zero. Denoting the start length, i.e., the tape length required to be payed off for time $(T_2 - T_1)$ from the setting of the start/stop flip-flop 7 till the setting of the read-out control flip-flop 8, by $(L_2 \pm \alpha_2)$ and the stop length, i.e., the tape length by $(L_1 \pm \alpha_1)$, there is required between two adjacent data blocks a minimum length of $|L_1 + L_2 \pm \alpha_1 \pm \alpha_2|$. If the gap between them is less than this minimum length, data recorded on a portion adjacent the beginning of the subsequent data block can not be read out by the magnetic tape read-out device controlled by the conventional control system due to the above start and stop lengths. Therefore, the prior tape necessitates a large length between two adjacent data blocks to make up for the start and stop of the tape, resulting in an increased tape length to the disadvantage.

SUMMARY OF THE INVENTION

An object of the invention is to provide a system for controlling the read-out device, which enables reading data out of a tape having an extremely small gap between two adjacent data blocks.

According to the invention, there is provided a system for controlling the read-out device to read out data recorded on a tape, comprising a first means for preliminarily setting the direction of travel of the tape to the direction opposite to the read-out direction and after a predetermined time reversing the direction to the same direction as the read-out direction for starting the read-out, and a second means for starting the tape in the direction set by said first means and stopping the tape when the read-out of data of one data block is ended, whereby the tape is driven first in the direction opposite to the read-out direction and then in the read-out direction after the predetermined time at the commencement of the read-out.

DETAILED DESCRIPTION OF THE INVENTION

The invention will now be described in conjunction with preferred embodiments thereof with reference to the accompanying drawings.

Figure 1:
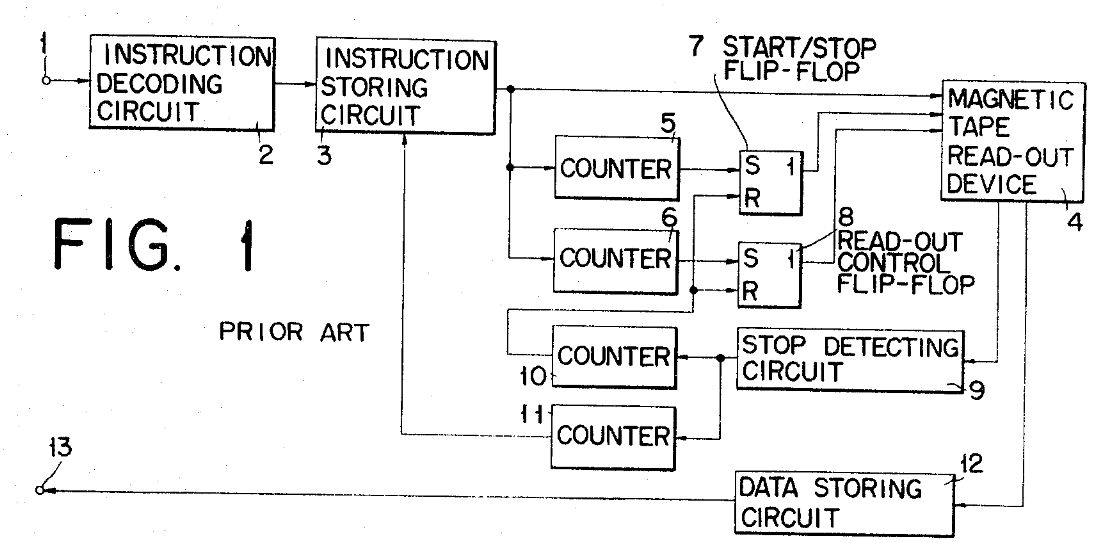
FIG. 1 PRIOR ART
FIG. 1 is a block diagram outlining the conventional system for controlling a magnetic tape read-out device as shown above.
Figures 2A, 2B, 2C, 2D, 2E, 2F, 2G, 2H, 2I:
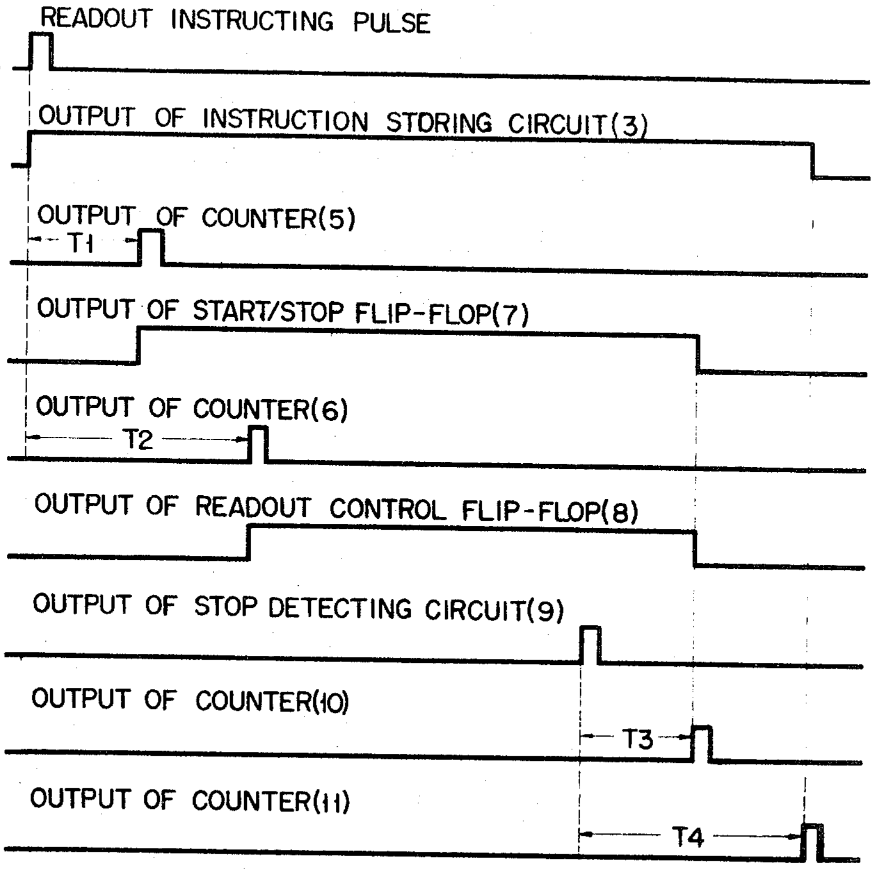
(PRIOR ART) FIG. 2A FIG. 2B FIG. 2C FIG. 2D FIG. 2E FIG. 2F FIG. 2G FIG. 2H FIG. 2I
FIGS. 2A to 2I are wave form time charts to illustrate the operation of the circuit of FIG. 1 as shown above.
Figure 3:
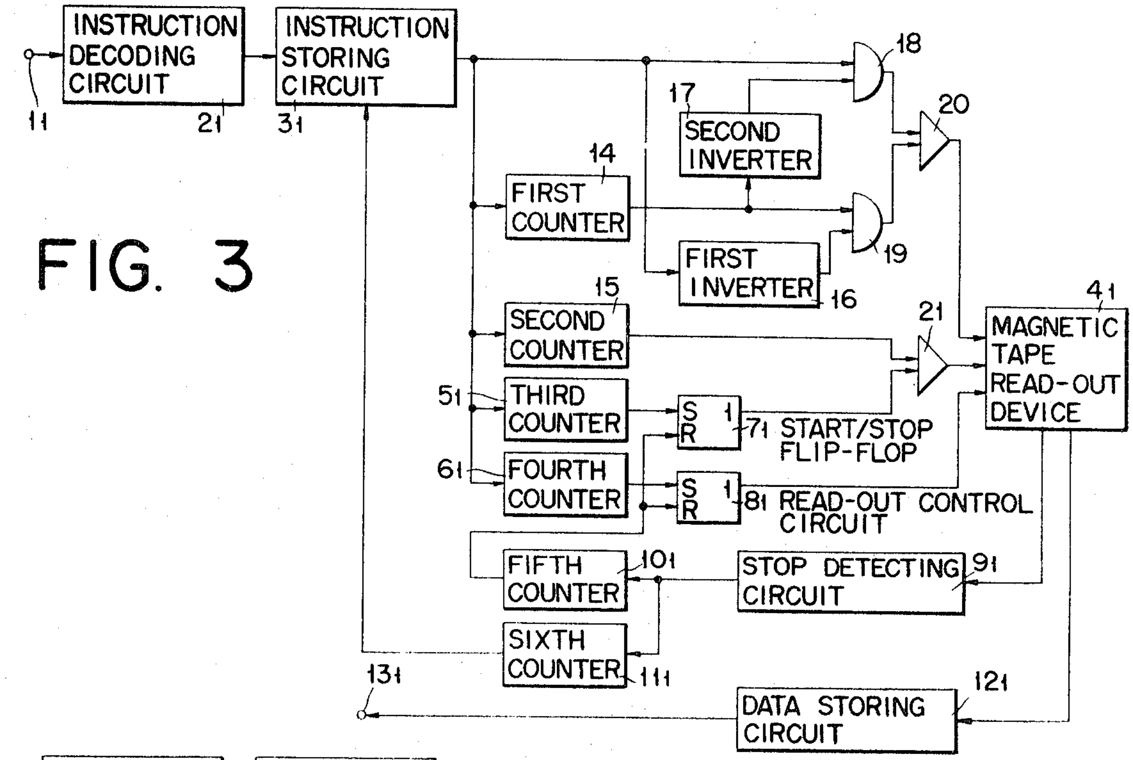
FIG. 3 is a block diagram showing an embodiment of the system for controlling a tape read-out device according to the invention.
Figures 4A, 4B, 4C, 4D, 4E, 4F, 4G, 4H, 4I, 4J, 4K, 4L, 4M, 4N, 4O, 4P, 4Q:
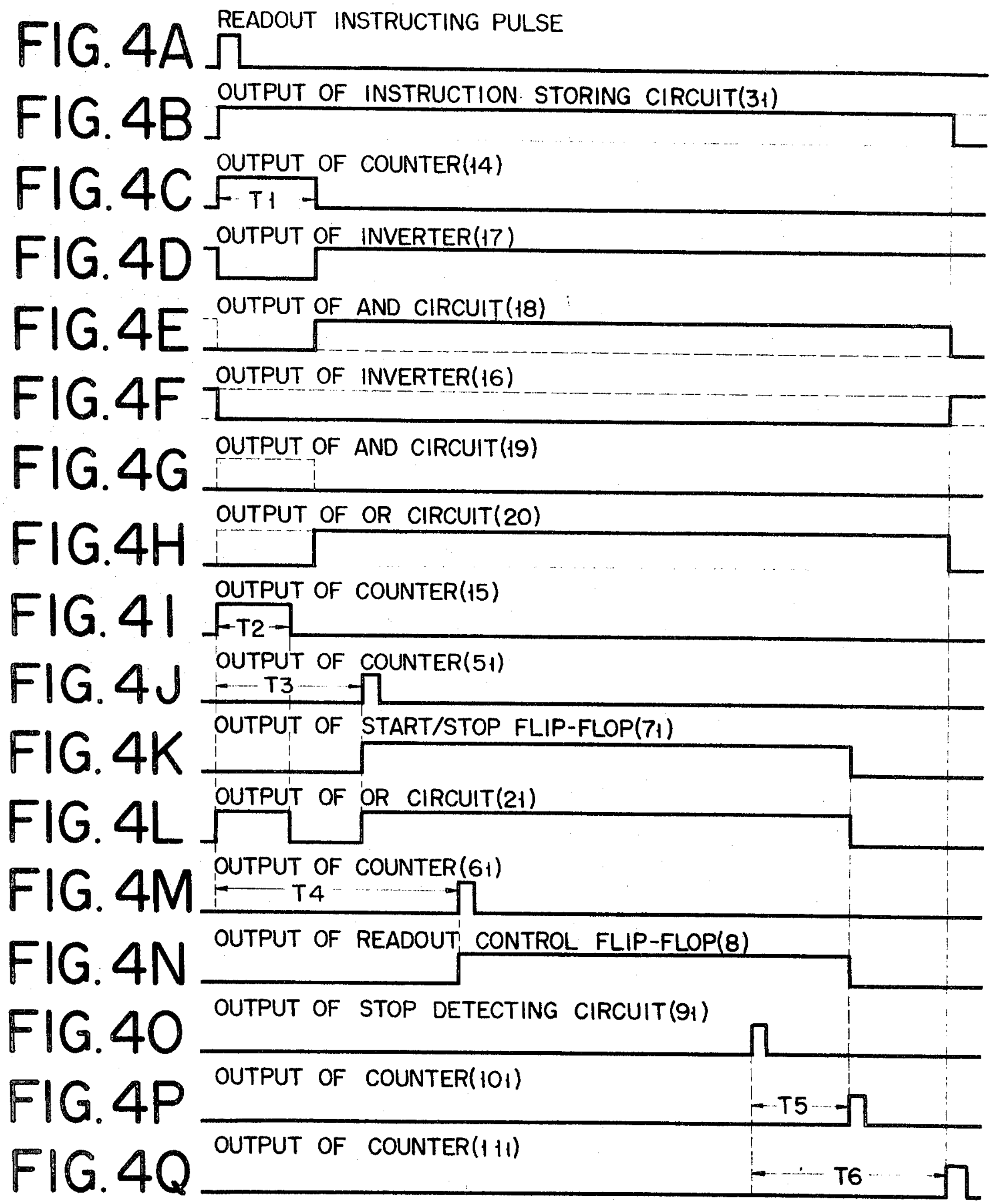
FIGS. 4A to 4Q are wave form time charts to illustrate the operation of the circuit of FIG. 3.

Referring now to FIGS. 3 and 4A to 4Q, showing a system for controlling a magnetic tape read-out device, a read-out instruction pulse is impressed through an input terminal $\mathbf{1}_1$ on an instruction decoding circuit $\mathbf{2}_1$, whose output is stored in an instruction storing circuit $\mathbf{3}_1$. The output of the instruction storing circuit $\mathbf{3}_1$ is impressed on a first counter 14, a second counter 15, a third counter $\mathbf{5}_1$, a fourth counter $\mathbf{6}_1$, a first inverter circuit 16 and one input terminal of a first AND circuit 18. The output of the first counter 14 is simultaneously fed both to the other terminal of the first AND circuit 18 through a second inverter 17 and to one input terminal of a second AND circuit 19, whose other input terminal receives the output from the first inverter 16. The outputs of both the first and second AND circuits 18 and 19 are fed to an OR circuit 20, whose output is fed to a magnetic tape read-out device $\mathbf{4}_1$. The output of the second counter 15 is impressed on one input terminal of a second OR circuit 21. The output signal from the third counter $\mathbf{5}_1$ sets a start/stop flip-flop $\mathbf{7}_1$, whose set output is fed to the other terminal of the second OR circuit 21, whose output is in turn fed to the magnetic tape read-out device $4_1$. The output of the fourth counter $6_1$ sets a read-out control flip-flop $8_1$, whose set output is fed to the magnetic tape read-out device $4_1$. The output from a stop detecting circuit $9_1$ is simultaneously fed both to a fifth counter $10_1$, whose output is fed to both the reset terminals of the start/stop and read-out control flip-flops $7_1$ and $8_1$ as well as to a sixth counter $11_1$ providing and output to a reset terminal of the instruction storing circuit $3_1$.

The time relation among outputs of various component parts of the control system of the above construction is shown in FIG. 4.

The read-out instruction coming through an input terminal $1_1$ is impressed on and decoded by the instruction decoding circuit $2_1$ and stored in the instruction storing circuit $3_1$. When the stored instruction is dictating the forward read-out operation of the read-out device $4_1$, a positive signal appears from the instruction storing circuit $3_1$, while when the reverse read-out is instructed, a negative signal appears from the circuit $3_1$. As shown in FIG. 4, output signal levels as indicated by solid lines result when the instruction dictates forward travel of the tape, while in case of reverse tape travel output signal levels as indicated by dashed lines result.

The operation is now described in case of the forward read-out. A positive instructing pulse (shown at FIG. 4A) appearing from the instruction storing circuit $3_1$ is simultaneously impressed on one input terminal of the first AND circuit 18 and the first to fourth counters 14, 15, $5_1$ and $6_1$. During time $T_1$ from the impression of the instructing pulse the first counter 14 produces a positive signal (as shown at FIG. 4C), which is fed both to one input terminal of the second AND circuit 19 and to the second inverter 17, where it is inverted into a negative signal (as shown at FIG. 4D) for impression on the other input terminal of the first AND circuit 18. Thus, during time $T_1$ a negative output signal (as shown at FIG. 4E) appearing from the first AND circuit 18 is fed to one input terminal of the OR circuit 20. During this time, and until the instruction storing circuit $3_1$ is reset, the first inverter 16 provides negative output signal (as shown at FIG. 4F), and the second AND circuit 19 receiving this negative output signal and the output signal from the first counter 14 produces also a negative output signal to be fed to the other input terminal of the OR circuit 20. Thus the output signal from the first OR circuit 20 is negative during time $T_1$ (as shown at FIG. 4H), during which the direction of travel of the magnetic tape in the read-out device $4_1$ is thus set to the reverse direction.

After time $T_1$, a negative output signal appears from the first counter 14. Thus, after time $T_1$ the output of the second inverter 17 and the output from the first AND circuit 18 are positive, while the second AND circuit 19 produces a negative AND output signal as its two input signals are both negative, so that the first OR circuit 20 receives both positive signal at the input terminal connected to the second AND circuit 19 to produce positive OR output, thus setting the direction of travel of the tape in the read-out device $4_1$ to the forward direction.

The second counter 15 provides a positive output signal during time $T_2$ (as shown at FIG. 4I) for impression on one input terminal of the second OR circuit 21 concurrently receiving at the other input terminal the output of the start/stop flip-flop $7_1$, which is set by the output of the third counter $5_1$. The output of the second OR circuit 21 is fed to the read-out device $4_1$ to control the starting of the magnetic tape in the direction pre-set by the output of the first OR circuit 20. After time $T_3$ from the impression of the instruction signal the third counter $5_1$ provides an output pulse (as shown at FIG. 4J) to set the start/stop flip-flop $7_1$ (as shown at FIG. 4K). After time $T_4$ from the impression of the instruction pulse the fourth counter $6_1$ produces an output pulse (as shown at FIG. 4N), whose output controls the read-out operation of the magnetic tape read-out device $4_1$. The delay times $T_1$, $T_2$, $T_3$ and $T_4$ are pre-set such that $$T_1 \geqq T_2 \text{ and } T_4 > T_3 \geqq T_1$$

as shown in FIGS. 4A to 4Q.

As is seen, subsequent to the impression of the read-out instruction signal on the instruction storing circuit $3_1$, the magnetic tape read-out device receives a negative signal from the first OR circuit 20 during time $T_1$ and a positive signal from the OR circuit 20 after time $T_1$ is passed, and it also receives a positive signal from the second OR circuit 21 during time $T_2$ and after time $T_3$ is passed (as shown at FIG. 4L). Thus, the magnetic tape in the read-out device is driven in the reverse direction during time $T_2$, the tape speed is gradually decreased to temporarily stop the tape after time $T_2$, and the magnetic tape is re-started in the forward direction after time $T_3$ and during time $T_4$, upon termination of which the output pulse from the fourth counter $6_1$ sets the read-out control flip-flop $8_1$ to start the read-out operation of the magnetic tape read-out device $4_1$. The read-out operation is started very quickly after the setting of the start/stop flip-flop $7_1$.

The data read out of the tape is temporarily stored in the data storing circuit $12_1$ before being sent out through the output terminal $13_1$ to the external circuit (not shown).

When a stop code indicating the end of the data block being read out is detected, the stop detection circuit $9_1$ products a stop detection signal (as shown at FIG. 4O) for impression upon the fifth and sixth counters $10_1$ and $11_1$, which produce respective output signals respectively at times $T_5$ and $T_6$ after the impression of the stop detection signal. Time $T_3$ is required for the compensation of the time delay of the system and is preferably equal to zero. In an ideal case, the fifth counter $10_1$ is negligible. The output signal from the fifth counter $10_1$ resets the start/stop and read-out control flip-flops $7_1$ and $8_1$, and the output signal from the sixth counter $11_1$ resets the content of the instruction storing circuit $3_1$. By resetting these circuits, the tape driving is stopped to end the read-out for one data block. The foregoing sequence of operation is repeated over and again.

In case of reverse read-out, where the direction of travel of the tape is opposite to that in the above case, the tape is driven in the forward direction during time $T_2$ and in the reverse direction after time $T_3$ is passed, so as to carry out the reverse read-out.

As is described in the foregoing, with the system for controlling the magnetic tape read-out device according to the invention the tape is preliminarily driven in the direction opposite to the read-out direction, temporarily stopped and re-driven in the read-out direction to commence the read-out by the read-out device, so that it is possible to read out data block by block without need of an extra length of tape between two adjacent data blocks, which have heretofore been necessary for starting and stopping the tape, and to use a tape whose length between two adjacent data blocks is small as that between two adjacent data thus outstandingly reducing the overall tape length.

Figure 5:
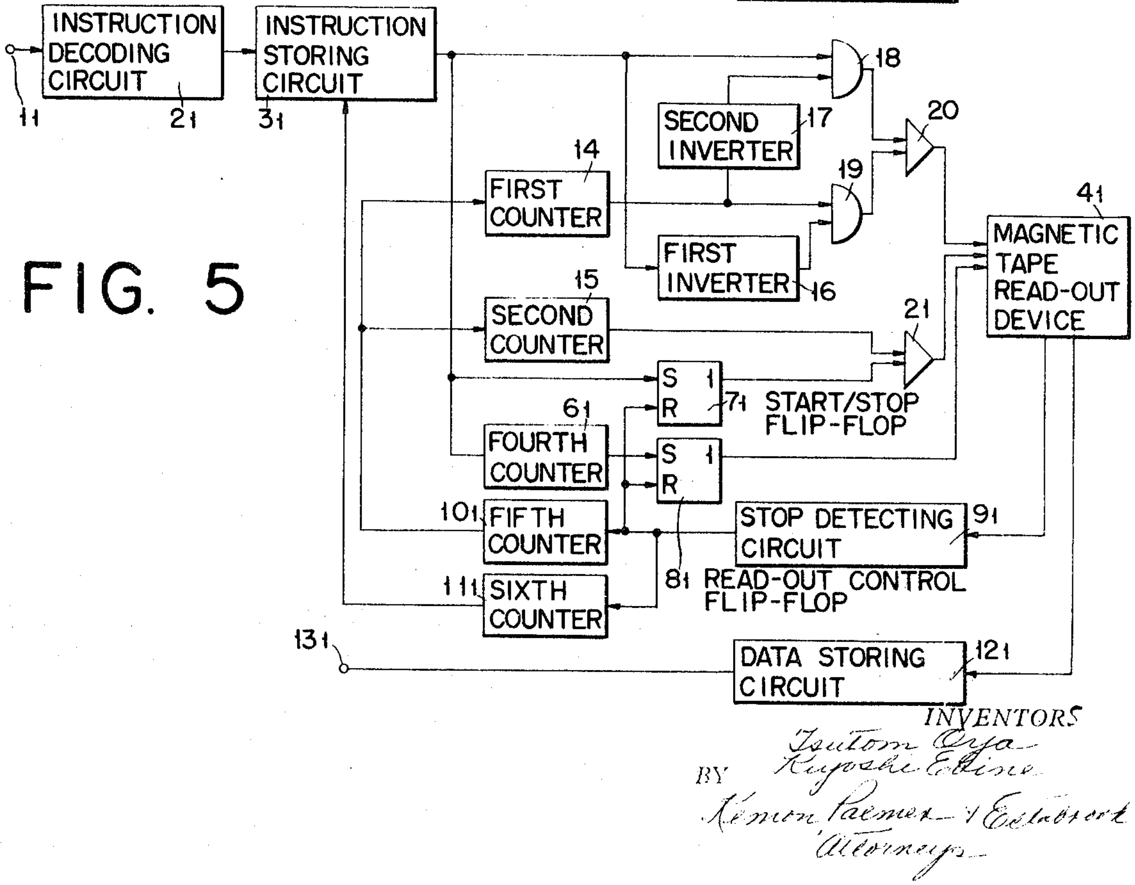
FIG. 5 is a block diagram showing another embodiment of the system for controlling a tape read-out device according to the invention.
Figures 6A, 6B, 6C, 6D, 6E, 6F, 6G, 6H, 6I, 6J, 6K, 6L, 6M, 6N, 6O, 6P:
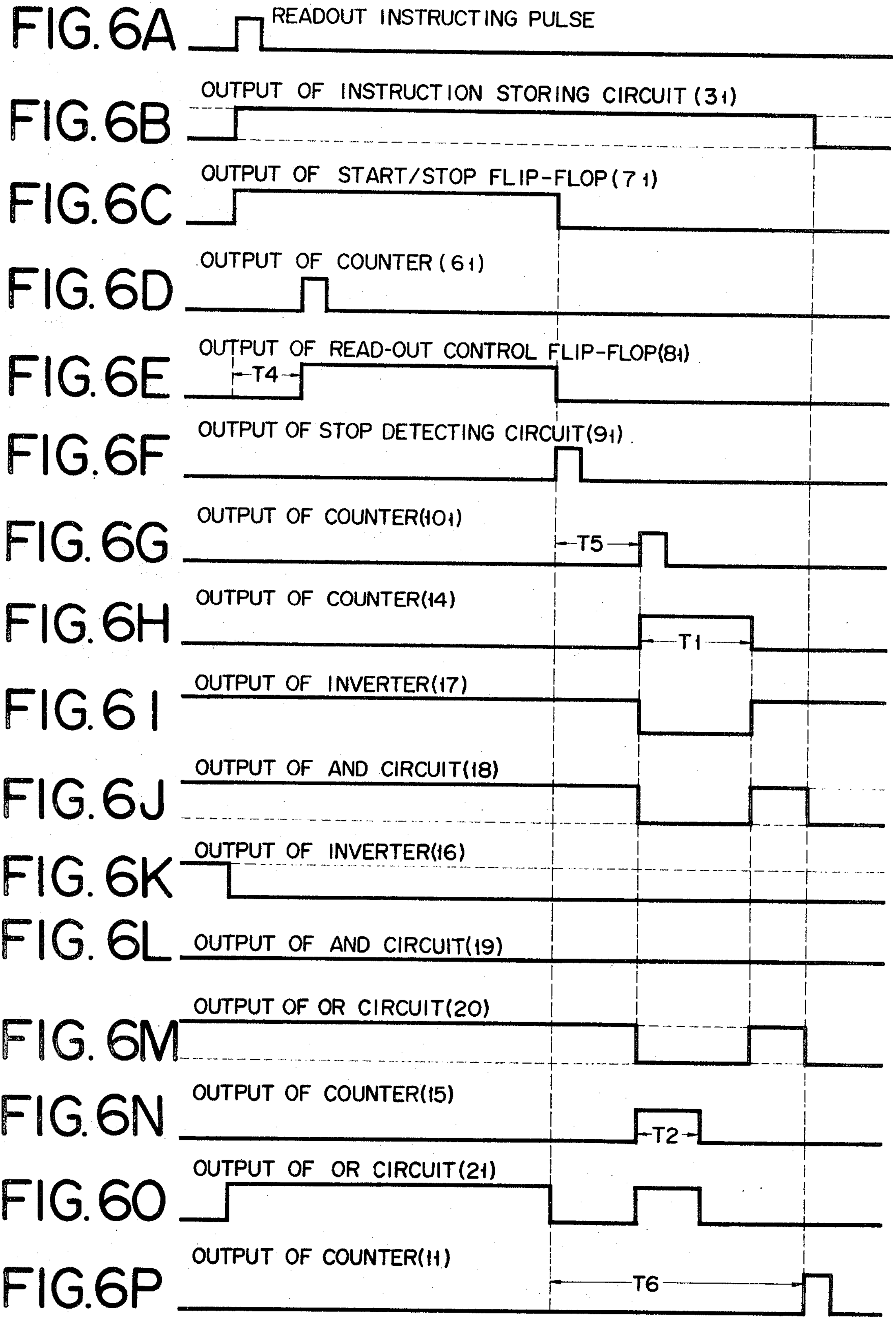
FIGS. 6A to 6P are wave form time charts to illustrate the operation of the circuit of FIG. 5.

FIGS. 5 and 6A to 6P illustrate another embodiment, which eliminates the step of driving the tape in the direction opposite to the read-out direction and permits directly driving the tape in the read-out direction on the beginning of the read-out from one data block by preliminarily driving the tape in the direction opposite to the read-out direction subsequent to the completion of the read-out for prior data block, temporarily stopping the tape and then re-driving the tape in the read-out direction for commencing the read-out for the next data block.

In FIG. 5, parts similar to those shown in FIG. 3 are designated by like reference numerals and their description is omitted.

The output signal from the instruction storing circuit $3_1$ is simultaneously impressed on the set input terminal of the start/stop flip-flop $7_1$, the fourth counter $6_1$, the first inverter 16, and the first AND circuit 18. The output signal from the stop detecting circuit $9_1$ is supplied to the reset terminals of the start/stop flip-flop $7_1$ and the read-out control circuit $8_1$. The output signal from the fifth counter $10_1$ is impressed on the first and second counters 14 and 15. In ideal case the fifth counter $10_1$ is negligible.

The operation of the embodiment of FIG. 5 is now described with reference to the wave form time charts of FIGS. 6A to 6P. In the figure, output signal levels as indicated by solid lines result when the instruction dictates forward travel of the tape, while in case of the reverse tape travel output signal levels as indicated by solid lines result. The following operation applies in case of the forward read-out.

When the read-out instruction pulse (as shown at FIG. 6A) is impressed on the input terminal $1_1$, the instruction storing circuit $3_1$ produces positive output signal (as shown at FIG. 6B) to be fed to one input terminal of the first AND circuit 18, whose other input terminal receives positive output of the second inverter (as shown at FIG. 6I) receiving negative output of the first counter 14 (as shown at FIG. 6H) thus producing an AND output of the first AND circuit 18 (as shown at FIG. 6J) to cause the first OR circuit 20 to produce a positive output (as shown at FIG. 6M) fed to the magnetic tape read-out device $4_1$, thus setting the direction of the tape to the forward direction. The positive output signal from the instruction storing circuit $3_1$ also sets the start/stop flip-flop $7_1$ (as shown at FIG. 6C), whose set output is fed through the OR circuit 20 to the magnetic tape read-out device $4_1$ to start the tape. Time $T_4$ after the impression of the output signal from the instruction storing circuit $3_1$ on the fourth counter $6_1$, the counter $6_1$ produces an output pulse (as shown at FIG. 6D) to set the read-out control flip-flop $8_1$(as shown at FIG. 6E) so as to start the read-out operation of the magnetic tape read-out device $4_1$. Upon completion of the data read-out for one data block the stop detecting circuit $9_1$ detects a stop code (as shown at FIG. 6F) and produces a stop detection signal, which resets both the start/stop and read-out control flip-flops $7_1$ and $8_1$ (as shown at FIGS. 6C and 6E respectively), thereby stopping both the tape movement and the read-out operation. After time $T_5$ from appearance of the stop detection signal, the fifth counter $10_1$ produces an output pulse (as shown at FIG. 6G) to set the first counter 14 for time $T_1$ (as shown at FIG. 6H), during which the first counter 14 provides a positive output, so that the first AND circuit 18 does not provide an AND output (as shown at FIG. 6J). Also, the second AND circuit 19 does not produce an AND output, since it receives a positive signal at the first input terminal from the first counter 14 and a negative signal at the second input terminal from the second inverter 17 receiving the output of the instruction storing circuit $3_1$ (as shown at FIG. 6L). Since both the first and second AND circuits 18 and 19 produce a negative signal, the OR circuit 20 produces a negative signal (as shown at FIG. 6M), thus reversely setting the direction of the tape travel. Since the output signal of the fifth counter $10_1$ is simultaneously impressed on both the first and second counters 14 and 15, the second counter 15 provides a positive output for time $T_2$ (as shown at FIG. 6N) fed through the second OR circuit (as shown at FIG. 6O) to the magnetic tape read-out device $4_1$ to drive the tape. Since the set direction of travel of the tape is opposite to the read-out direction, the tape travels in the reverse direction during time $T_2$. After time $T_2$, the tape speed gradually decreases and the tape is eventually stopped to be ready for the read-out for the next data block. At time $T_6$ after appearance of the stop detection signal, the sixth counter $11_1$ produces an output pulse to reset the instruction storing circuit $3_1$. These relations are represented as $$T_1 \leq T_2 \text{ and } T_6 > T_1 + T_5$$

With the embodiment of FIG. 5, it is possible to use a tape similar to the previous embodiment of FIG. 3.

Although the foregoing description is concerned with magnetic tape, the invention of course may be applied to tapes having punched holes. Counters used in the above embodiments may be replaced by mono-stable circuits or suitable delay circuits.

What we claim is:

1. A system for controlling devices to read out data recorded on a tape, comprising:

an instruction signal forming means including an instruction decoding circuit and an instruction storing circuit for storing the output signals from said decoding circuit and producing positive instruction signals;

means for receiving the instruction signals and preliminarily setting the direction of traveling of the tape to a direction opposite to the read out direction and subsequently to the read out direction after a predetermined time, said means including a first AND circuit having one input terminal to which said positive instruction signals are supplied, a first inverter for reversing the polarization of said positive instruction signals, a first means for producing positive output signals for time ($T_1$) after said positive instruction signals are supplied thereto, a second AND circuit having one input terminal for receiving the output signals from said first means and the other input terminal for receiving negative output signals from said inverter thereby to produce negative output signals, a second inverter for receiving output signals from said first means, producing negative output signals for said time ($T_1$) and thereafter producing positive output signals, thereby to cause the output signals to be supplied to the other input terminal of said first AND circuit, negative output signals to be produced from said first AND circuit for said time ($T_1$) and positive output signals to be produced from said AND circuit after said time ($T_1$), a first OR circuit for receiving output signals from said first and second AND circuits, producing negative output signals for said time ($T_1$) thereby to set the traveling direction of the tape opposite to that in which it is read out and producing positive output signals after said ($T_1$) thereby to set the traveling direction of the tape equal to that in which it is read out;

and a means for starting the tape in the direction set by said direction setting means and stopping the tape after the read out from the tape is finished, said tape starting and stopping means including a second means for producing positive output signals for time ($T_2$) ($T_1 \geqslant T_2$) when said positive instruction signals are supplied thereto, a third means for producing positive output signals in time ($T_3$) ($T_3 > T_1$) after said positive instruction signals are supplied thereto, a start/stop flip-flop which is set by the positive output signals from said third means, a second OR circuit for receiving output signals from both said second means and said start/stop flip-flop producing positive output signals at said time ($T_2$) to enable the tape to travel in the direction opposite to the read out direction, thereafter stopping driving the travel of the tape for time ($T_3 - T_2$) and again producing positive output signals to cause the tape to travel in the read out direction, a read out control flip-flop for producing positive output signals in time ($T_4$) ($T_4 > T_3$) after the positive instruction signals are fed thereto thereby to control the read out operation of data from the tape, a circuit for detecting the completion of one data block of the tape, a fifth means for producing output signals a time ($T_5$) after said stop detecting signals are applied thereto, thereby to reset both said start/stop flip-flop and said read out control flip-flop, and a sixth means for producing output signals at time ($T_6$) ($T_6 > T_5$) after said stop detecting signals are fed thereto, thereby to reset said instruction storing circuit.

2. System according to claim 1 wherein said first to sixth means are respectively formed of counters.

3. A system for controlling devices to read out data recorded on a tape comprising:

an instruction signal forming means including instruction decoding circuits to which input signals are fed and an instruction storing circuit for storing output signals from said decoding circuit to produce positive instruction signals;

a means for receiving the instruction signal and setting the direction of travelling of the tape to the read-out direction at the time of starting the read-out and to the direction opposite to the read-out direction a predetermined time after the read-out is finished, and a means for starting the tape in the direction set by said direction setting means at the time of starting the read-out, stopping the tape travelling after the read-out of data from the tape is finished, starting the tape travelling in the direction opposite to the read-out direction for a period corresponding to the time when the tape travelling is set in the direction opposite to the read-out direction and finally stopping the tape travelling including a first AND circuit having one input terminal to which said positive instruction signals are applied, a first inverter for reversing the polarity of said positive instruction signals, a first means for producing positive output signals for time ($T_1$) after said tape is stopped and producing negative output signals for other periods than said time ($T_1$), a second AND circuit having one input terminal receiving the output signals from said first means and the other input terminal receiving the output signals from said first inverter thereby to produce negative signals continuously, a second inverter for reversing the polarity of the output signals from said first means and applying the inverted output signals to the other input terminal of said first AND circuit thereby to cause the AND circuit to produce positive output signals for periods other than said time ($T_1$), a first OR circuit for receiving output signals from both said first and second AND circuits producing positive output signals for periods other than said time ($T_1$) thereby to set the travelling direction of the tape to the read out direction and producing negative output signals for time ($T_1$) thereby to set the traveling direction of the tape opposite to the read out direction, a start/stop flip-flop which is set by the impression of the positive instruction signal from said instruction storing circuit, a second OR circuit for causing the tape to first travel in the read out direction on application of the output signals from said flip-flop, a fourth means for producing output signals for a time ($T_4$) after the positive instruction signals are supplied thereto, a read out control flip-flop which is set by output signals from said fourth means, thereby to control the read out operation from the tape, a stop detecting circuit for detecting the completion of the read out of one data block from the tape and producing stop detecting signals by which said flip-flops are reset thereby to stop driving of the tape, a fifth means for producing output signals at time ($T_5$) after said stop detecting signals are supplied thereto, these output signals being fed to said first means to cause said means to produce positive output signals for time ($T_1$), thereby to set the travelling direction of the tape opposite to the read out direction, a second means for receiving output signals from said fifth means producing positive output signals for time ($T_2$) ($T_1 \geq T_2$) after which the tape is stopped thereby to cause the tape to travel in the direction opposite the read out direction and finally to stop the tape travelling, and a sixth means for producing output signals in time ($T_6$) ($T_6 \geq T_5 + T_2$) after said stop detecting signals are supplied thereto, and resetting the instruction storing circuit by the output signals thereof.

4. System according to claim 3 wherein said first to sixth means are respectively formed of counters.

* * * * *